United States Patent
Yang

(10) Patent No.: US 8,886,042 B2
(45) Date of Patent: Nov. 11, 2014

(54) METHOD AND SYSTEM FOR SCHEDULING UPLINK MESSAGE BASED ON GIGABIT-CAPABLE PASSIVE OPTICAL NETWORK (GPON)

(75) Inventor: Donghu Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 294 days.

(21) Appl. No.: 13/497,688

(22) PCT Filed: May 11, 2010

(86) PCT No.: PCT/CN2010/072634
§ 371 (c)(1), (2), (4) Date: Mar. 22, 2012

(87) PCT Pub. No.: WO2010/145353
PCT Pub. Date: Dec. 23, 2010

(65) Prior Publication Data
US 2012/0195596 A1 Aug. 2, 2012

(30) Foreign Application Priority Data
Sep. 23, 2009 (CN) .......................... 2009 1 0190223

(51) Int. Cl.
*H04B 10/20* (2006.01)
*H04L 12/865* (2013.01)
*H04L 12/863* (2013.01)
*H04Q 11/00* (2006.01)

(52) U.S. Cl.
CPC ........ *H04Q 11/0067* (2013.01); *H04L 47/6275* (2013.01); *H04Q 2011/0064* (2013.01); *H04Q 2011/0079* (2013.01); *H04Q 11/0071* (2013.01); *H04L 47/6215* (2013.01)
USPC .................................. 398/58; 398/70; 398/72

(58) Field of Classification Search
CPC . H04J 14/023; H04J 14/0232; H04J 14/0235; H04J 14/0239; H04J 14/0242; H04J 14/0265
USPC ................................................ 398/58, 66–72
See application file for complete search history.

(56) References Cited

U.S. PATENT DOCUMENTS

2008/0273878 A1* 11/2008 Wu et al. ......................... 398/67
2009/0154920 A1 6/2009 Yang
(Continued)

FOREIGN PATENT DOCUMENTS

CN 101047446 10/2007
CN 101079801 11/2007
(Continued)

OTHER PUBLICATIONS
European Search Report for PCT/CN2010/072634 mailed Apr. 11, 2013.
(Continued)

*Primary Examiner* — Dzung Tran
(74) *Attorney, Agent, or Firm* — Brian J. Colandreo; Jeffrey T. Placker; Holland & Knight LLP

(57) ABSTRACT

The present invention discloses a method and a system for scheduling an uplink message based on a Gigabit-capable Passive Optical Network (GPON). The method includes the following steps of: configuring a private managed entity for an 802.1p entity, and defining a mapping relationship between a priority queue and a priority of an uplink message in the private managed entity (S100); the 802.1p entity scheduling an uplink message from an optical network unit, mapping the uplink message to a corresponding GEM PORT, and creating a corresponding priority queue according to the mapping relationship between the priority queue and the priority of the uplink message defined in the private managed entity (S101). In the present invention, the uplink messages mapped to the GEM PORTs in the GPON system can be flexibly scheduled under the N:M bridge-mapping service model of the GPON system, and it is a beneficial extension to the existing mode for scheduling an uplink message based on the GPON system.

9 Claims, 3 Drawing Sheets

(56) References Cited

U.S. PATENT DOCUMENTS

2009/0208204 A1* 8/2009 Zhang et al. .................. 398/25
2009/0304386 A1* 12/2009 Effenberger .................. 398/58
2011/0200331 A1* 8/2011 Li et al. ........................ 398/45

FOREIGN PATENT DOCUMENTS

| CN | 101079801 A | 11/2007 |
|---|---|---|
| CN | 101425943 | 5/2009 |
| CN | 101516044 | 8/2009 |
| EP | 2019519 | 1/2009 |

OTHER PUBLICATIONS

Na Zhang and Hiedya Yoshiuchi "GPON system with user controlled port-ID assignment method, Network Architectures, Management and Applications VI", Proceedings of SPIE—International Society for Optical Engineering, SPIE International Society for Optical Engineering, US, vol. 7137, Nov. 19, 2008, pp. 1-7137D.

Zhang, et al., "GPON System with User Controlled Port-ID Assignment Method", Network Architectures Management, and Application VI, Proc. of SPIE, vol. 7137, 71370D (2008), pp. 1-8.

PCT/CN2010/072634 International Search Report dated Aug. 5, 2010, pp. 1-2.

* cited by examiner

METHOD AND SYSTEM FOR SCHEDULING UPLINK MESSAGE BASED ON GIGABIT-CAPABLE PASSIVE OPTICAL NETWORK (GPON)

RELATED APPLICATIONS

The subject application is a U.S. National Stage application of International Application No. PCT/CN2010/072634, filed on 11 May 2010, which claims the priority of Chinese Patent Application No.: 200910190223.8, filed on 23 Sep. 2009, the contents of which are herein incorporated by reference in its entirety.

FIELD OF THE PRESENT INVENTION

The present invention relates to the technical field of optical networks, and in particular to a method and a system for scheduling an uplink message based on a Gigabit-Capable Passive Optical Network (GPON).

BACKGROUND OF THE PRESENT INVENTION

A GPON system provides an integrated access standard of the latest generation broadband passive optical network based on the ITU-TG984.x standard. A GPON Transmission Convergence Layer (GPON GTC) provides two kinds of service data encapsulation methods, i.e., ATM encapsulation method and GPON Encapsulation Method (GEM), wherein the latter supports variable length encapsulation. A Transmission-container (T-CONT) is a basic control unit by which an Optical Line Terminal (OLT) controls an uplink message from an Optical Network Unit (ONU). In the GEM encapsulation method, the T-CONT bears one or more service flows, and ensures that each service flow meets different Quality of Service (Qos) requirements. A service transmission channel of the GEM encapsulation method is called as GEM Port (GEM PORT), when scheduling the uplink message from the ONU in a unicast manner, service encapsulation is first performed on the uplink message through a GEM interworking entity, and the uplink message encapsulated are then mapped to a corresponding GEM PORT, so that the uplink message is sent in the transmission time window of the T-CONT to which the GEM PORT belongs. The OLT assigns a globally unique PORT-ID of each GEM PORT for the ONU, i.e., different service flows are assigned with different PORT-IDs.

Based on different service requirements, the GPON standard defines multiple service models. The typical Ethernet service models includes N:P bridge-filtering service model and N:M bridge-mapping service model.

In the above, the N:P bridge-filtering service model of the system for scheduling uplink messages is as shown in FIG. 1. When the GPON system bears Ethernet services, the corresponding service adaptation module is a Media Access Control (MAC) bridge module which is capable of transmitting the uplink messages, received from a User Network Interface (UNI) side bridge port corresponding to the UNI port, to an Access Network Interface (ANI) side bridge port through a Vlan filter table according to a VLAN Tag field and destination MAC address of the unlink messages, the uplink messages, after being output from the ANI side bridge port, are mapped to a unique GEM interworking entity and GEM PORT, so as to create a Priority Queue (pq) to enter the T-CONT, if the uplink messages need to be mapped to different GEM PORTs according to different VLAN-Ids, it is necessary to configure multiple ANI side bridge ports.

The N:M bridge-mapping service model of the system for scheduling uplink messages is as shown in FIG. 2. In the system, each ANI side bridge port is connected with one 802.1p entity. After receiving Ethernet type uplink messages from the ANI side bridge ports, the 802.1p entity transmits the uplink messages according to a priority (P-bit) classification of each uplink message. The 802.1p entity provides 8 P-bit pointers, each of which pointing to the same GEM PORT or different GEM PORTs. The uplink messages mapped to each GEM PORT can enter the T-CONT through a pq corresponding to the GEM PORT. This model is capable of sequentially transmitting various uplink messages in a certain priority order, thereby realizing the technical solution that the uplink messages with the same VLAN-Ids and different P-bits are mapped to different GEM PORTs and pqs.

However, in the present GPON system, some OLT manufacturers do not support to configure the PORT-ID of the same GEM PORT time after time, i.e., an uplink message can only be selected to be mapped to a certain GEM PORT according to the P-bit, but different pqs cannot be created according to the P-bits. In order to solve the problem, in the related art, when the uplink messages with different P-bits are mapped to the same GEM PORT, pqs corresponding to different P-bits can be created according to a default mapping relationship between the P-bit pointers and the pqs, i.e., the uplink messages with higher P-bits enter the pq with earlier priority order, and correspondingly, the uplink messages with lower P-bits enter the pq with later priority order. However, this solution is not flexible, limited to creating pqs according to default rules. For example, in an application scenario, due to the specific needs, the uplink messages with higher P-bits need to be transmitted by selecting a pq with relatively later order. This solution cannot meet the requirement obviously, and in the related art, when the uplink messages with different P-bits are mapped to the same GEM PORT, it is also impossible to determine the number of the pqs needing to be created.

SUMMARY OF THE PRESENT INVENTION

The present invention provides a method and a system for scheduling an uplink message based on a GPON, which can flexibly schedule uplink messages with various priorities under the N:M bridge-mapping service model, and beneficially extend the existing mode for scheduling an uplink message based on the GPON system.

According to an aspect of the present invention, there is provided a method for scheduling an uplink message based on a GPON, including the following steps of: configuring a private managed entity for an 802.1p entity, and defining a mapping relationship between a priority queue and a priority of an uplink message in the private managed entity; and the 802.1p entity scheduling an uplink message from an optical network unit, mapping the uplink message to a corresponding GPON Encapsulation Method Port (GEM PORT), and creating a corresponding priority queue according to the mapping relationship between the priority queue and the priority of the uplink message defined in the private managed entity.

The step of configuring the private managed entity for the 802.1p entity comprises: creating the private managed entity automatically by the optical network unit according to an Optical Line Terminal (OLT) command.

The priority of the uplink message in the private managed entity is the same as the priority of the uplink message defined by other managed entities in a management information base of the optical network unit.

The mapping relationship between priority queues and the priorities of uplink messages within the same GEM PORT is defined in the private managed entity.

The mapping relationship between priority queues and the priorities of uplink messages within different GEM PORTs is defined in the private managed entity.

The step of scheduling the uplink message from the optical network unit by the 802.1p entity and creating a corresponding priority queue according to the mapping relationship between the priority queue and the priority of the uplink message defined in the private managed entity includes the steps of:

step A: searching the priority queue corresponding to the priority of each uplink message in order, if priorities of all uplink messages are traversed, ending the process, otherwise proceeding to next step; and step B: judging whether or not the found priority queue of the uplink message has been created, if so, returning to step A to continue to search the priority queue corresponding to the priority of the next uplink message, otherwise creating the corresponding priority queue and then returning to step A.

Step A includes:

step A1: searching the priority queue corresponding to the priority of each uplink message in a management information base of the optical network unit in order, if the priorities of all the uplink messages are traversed, ending the process, otherwise proceeding to next step;

step A2: judging whether or not the priority queue corresponding to the priority of the uplink message is nonempty, if so, proceeding to next step, otherwise returning to step A1;

step A3: judging whether or not the priority queue corresponding to the priority of the uplink message defined in the private managed entity is nonempty, if so, proceeding to step B, otherwise proceeding to next step; and step A4: finding a default priority queue corresponding to a GEM PORT associated with the 802.1p entity, then proceeding to step B.

If the mapping relationship between priority queues and priorities of uplink messages within the same GEM PORT is defined in the private managed entity, step A1 executes search operation on the uplink messages mapped to the same GEM PORT; otherwise, step A1 executes search operation on the uplink messages mapped to each GEM PORT in order.

The order in which step A1 executes search operation on the uplink messages mapped to the same GEM PORT is determined according to the priorities of the uplink messages.

According to a further aspect of the present invention, there is provided a system for scheduling an uplink message based on a GPON, including an 802.1p entity, wherein a private managed entity is configured in the 802.1p entity, and a mapping relationship between a priority queue and a priority of an uplink message is defined in the private managed entity; the 802.1p entity is configured to schedule an uplink message from an optical network unit and map the uplink message to a corresponding GPON Encapsulation Method Port (GEM PORT), and create a corresponding priority queue according to the mapping relationship between the priority queue and the priority of the uplink message defined in the private managed entity.

The beneficial effects of the present invention are that, in the method and the system for scheduling an uplink message based on a GPON of the present invention, a private Managed entity (ME) is configured in the 802.1p entity under the N:M bridge-mapping service model, so that the 802.1p entity can flexibly schedule the uplink message according to the mapping relationship between the P-bit of the uplink message and the pq defined in the private ME, which provides a reasonable basis for Ethernet service with respect to the creation of service flow. Therefore, it is a beneficial extension to the related art.

In the present invention, two situations whether or not the uplink message supports the private ME configuration are also taken into consideration. Corresponding pqs are respectively created for the uplink messages which support the private ME configuration and do not support the private ME configuration according to a certain scheduling rule, thereby making the method for scheduling an uplink message more reasonable and comprehensive.

DETAILED DESCRIPTION OF THE EMBODIMENTS

In the present invention, under an N:M bridge-mapping service model of a GPON system, a private ME is additionally configured for an existing 802.1p entity, and a mapping relationship between a pq and a P-bit of an uplink message is defined in the private ME, so that a corresponding pq is flexibly created for a message mapped to the GEM PORT according to the defined mapping relationship. The specific embodiments of the present invention will be described below in conjunction with the drawings.

Figure 1:
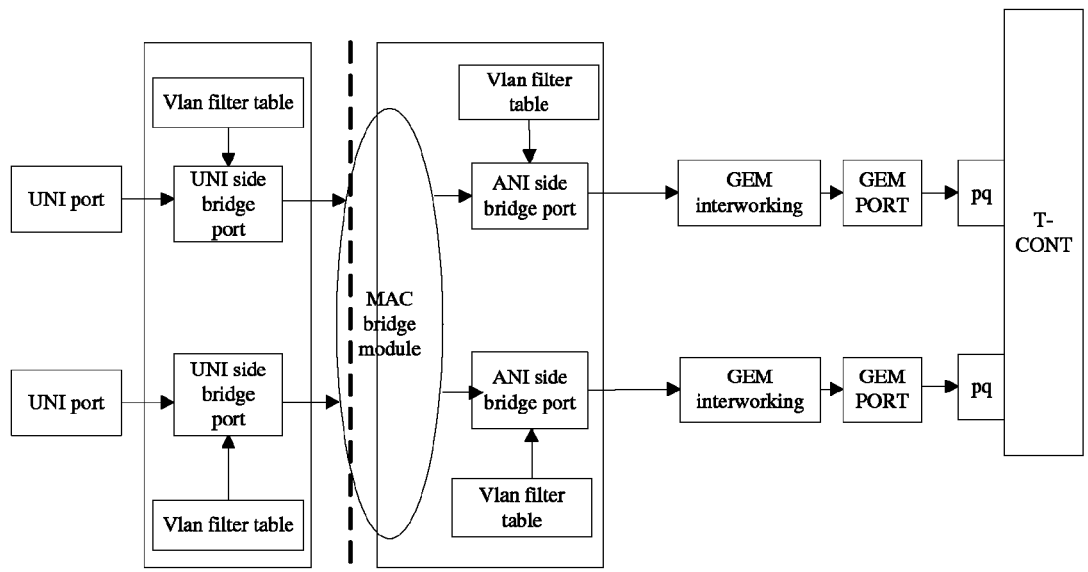
FIG. 1 is an N:P bridge-filtering service model of an existing system for scheduling an uplink message based on the GPON.
Figure 2:
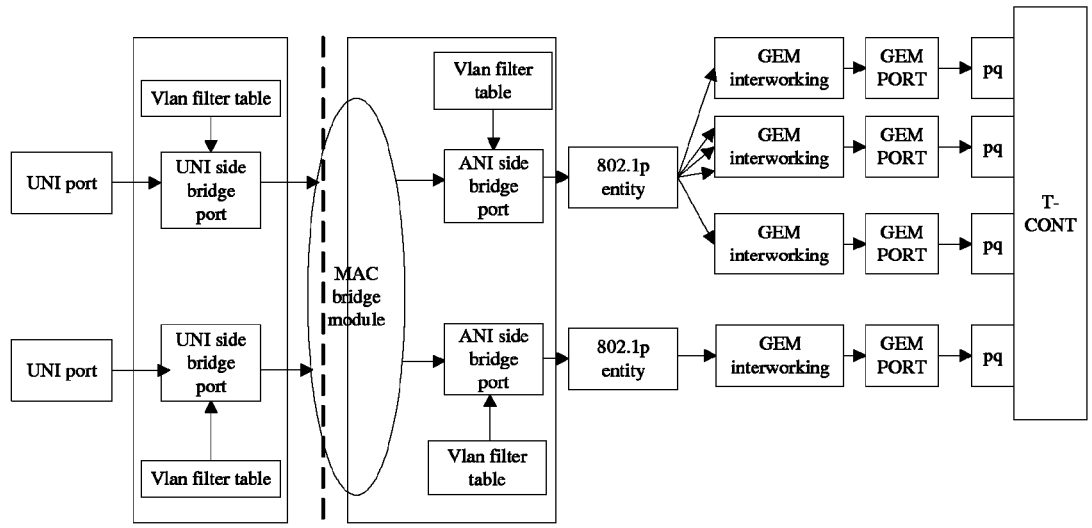
FIG. 2 is an N:M bridge-mapping service model of an existing system for scheduling an uplink message based on the GPON.
Figure 3:
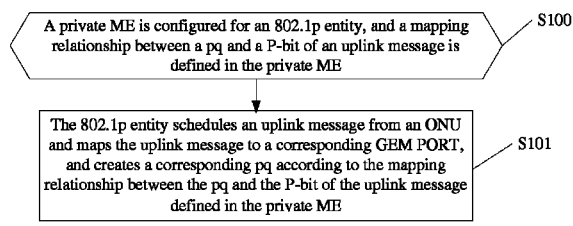
FIG. 3 is a flowchart of an implementation mode of a method for scheduling an uplink message based on the GPON according to an embodiment of the present invention.

FIG. 3 is a flowchart of an implementation mode of a method for scheduling an uplink message based on the GPON according to an embodiment of the present invention, which includes the steps as follows.

Step S100: a private ME is additionally configured for an 802.1p entity, and a mapping relationship between a pq and a P-bit of an uplink message is defined in the private ME according to specific needs, for example, an ONU can automatically create the private ME when receiving an OLT command from an OLT.

Since the 802.1p entity provides 8 different P-bit pointers, according to the actual application, an uplink message with one P-bit may only be mapped to one GEM PORT, and multiple uplink messages with different P-bits may also be mapped to the same GEM PORT. Therefore, a mapping relationship between the pqs and the P-bits of the uplink messages within the same GEM PORT can be defined in the private ME, for example, the uplink messages with P-bit being respectively 0, 1, 2 and 4 mapped to the same GEM PORT correspond to the pqs with priority order being respectively 1, 0, 3 and 2; and the mapping relationship between the pqs and the P-bits of the uplink messages within different GEM PORTs can also be defined, for example, it can be defined that the uplink message with P-bit being 7 mapped to another GEM PORT corresponds to the pq with priority order being 6. At the same time, it is also necessary to define that the ME-ID of the private ME is the same as other ME-IDs of the 802.1p entity, i.e., the P-bit of the uplink message defined in the private ME is the same as that of the uplink messages defined in other MEs within the Management Information Base (MIB) of the ONU.

Step S101: after receiving an Ethernet type uplink messages from the ONU via ANI side bridge port(s), the 802.1p entity schedules these uplink messages and maps them to the corresponding GEM PORT(s), and creates the corresponding pqs according to the mapping relationship between the pq and the P-bit of the uplink message defined in the private ME, thereby making the service flow enter a T-CONT.

Figure 4:
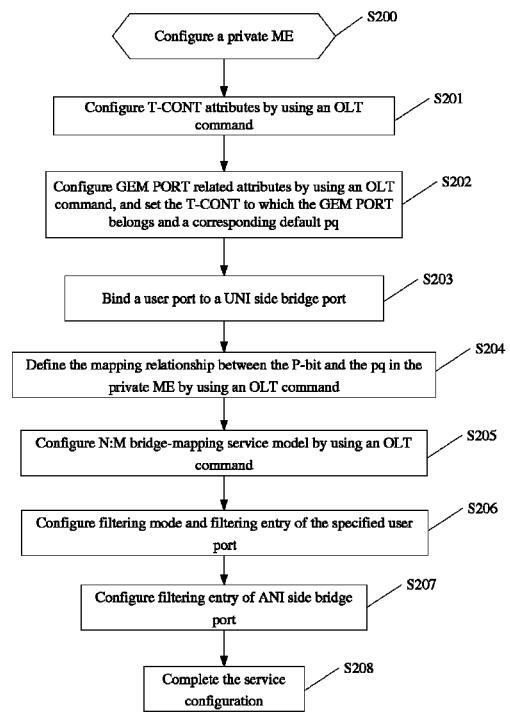
FIG. 4 is a flowchart of the service model configuration of a method for scheduling an uplink message based on the GPON according to an embodiment of the present invention.

FIG. 4 is a flowchart of the service model configuration of a method for scheduling an uplink message based on the GPON according to an embodiment of the present invention, in which the specific execution order of each step can be determined as required, and the configuration process includes the steps as follows.

Step S200: a private ME is additionally configured for an 802.1p entity, for example, the private ME is described as follows:
Name
Extended 802.1p mapper service profile (MeClassId=240).
Relationships
The ME is associated with the 802.1p Mapper Service Profile.
Attributes
Managed Entity id: id of the private ME.
Alternate upstream queue pointer (for P-bit priority 0): pq corresponding to P-bit 0.
Alternate upstream queue pointer (for P-bit priority 1): pq corresponding to P-bit 1.
Alternate upstream queue pointer (for P-bit priority 7): pq corresponding to P-bit 7.
Actions
delete, get, set
Notifications
None Step S201: T-CONT attributes (tcont 1 name tcont1 traffic default) is configured by using an OLT command.

Step S202: GEM PORT related attributes (gemport 1 name gemport1 unicast tcont 1 downtraffic default cos 3) is configured by using an OLT command.

Step S203: a user port of the ONU is bound to a UNI side bridge port (bridge-port uni-bind eth_0/1 bridge_0/1/1).

Step S204: a mapping relationship between pqs and P-bits of 8 uplink messages is defined in the private ME by using an OLT command, for example, in the private ME attributes, the P-bit pointer with P-bit being 0 (To better illustrate, the P-bit pointer is labelled as P-bit, and so on) is configured to correspond to the pq with priority order being 1 (To better illustrate, the pq is labelled as pq1, and so on), P-bit1 is configured to correspond to pq0, P-bit2 is configured to correspond to pq3, and P-bit4 is configured to correspond to pq2.

Step 5205: the N:M bridge-mapping service model is configured by using an OLT command, the command uses the GEM PORT configured in Step S202 and completes the following functions: to create an MAC bridge module, an ANI side bridge port, an 802.1p entity and a GEM interworking entity, and to set 8 P-bit2 pointers of the 802.1p entity to point to the same GEM interworking entity (interwork gemport name1 dot1p-bridge uplink_0/1/1 prio-list 0, 1, 2, 4).

Step S206: a filtering mode and a filtering entry of the user port specified in Step S203 are configured.

Step S207: a filtering entry of the ANI side bridge port created in Step S205 is configured, wherein the filtering entry configured herein is consistent with the filtering entry of the user port in Step S206.

Step S208: the service configuration is completed, the service model can create different pqs after mapping the uplink messages with different P-bits to the GEM PORT, which realizes the function that the ONU flexibly schedules data stream in a Strict Priority (SP) manner according to the set P-bits of the uplink messages.

The present invention also provides a method for scheduling an uplink message according to a mapping relationship between a pq and a P-bit of the uplink message defined in a private ME. The implementation process of the method is as follows.

Step A: Firstly, the pq corresponding to the P-bit of each uplink message is searched in order, i.e., the object to which each P-bit pointer points is searched, if the P-bits of all the uplink messages are traversed, end the process, otherwise proceed to the next step.

Step B: Next, it is judged whether or not the found pq has been created, if so, return to Step A to search the pq corresponding to the P-bit of the next uplink message; otherwise the corresponding pq is created, then return to Step A to search the pq corresponding to the P-bit of the next uplink message.

Figure 5:
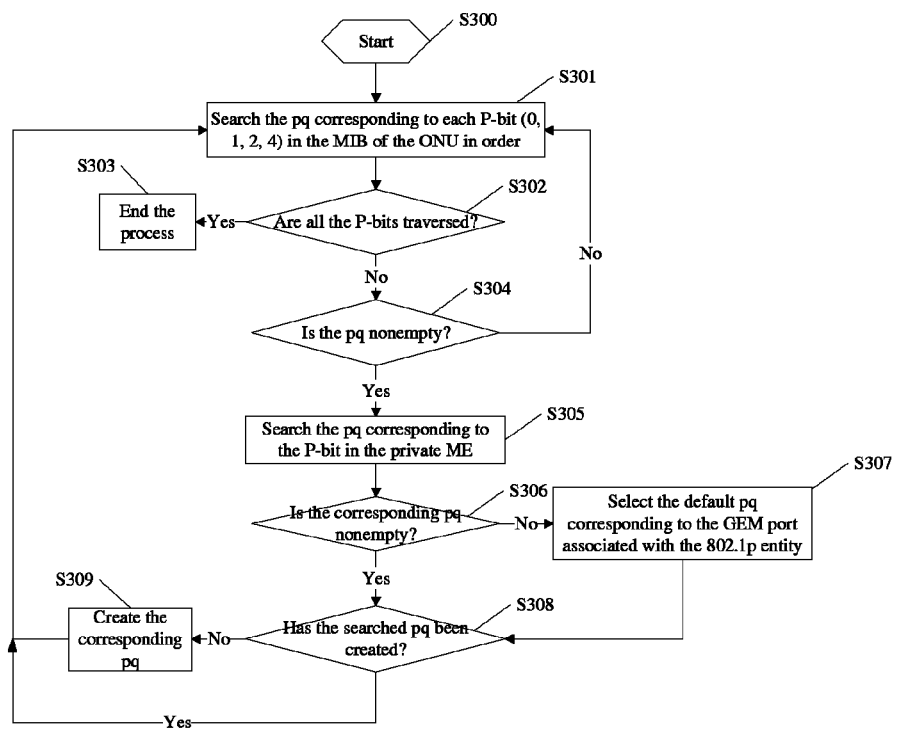
FIG. 5 is a flowchart of an implementation mode of scheduling uplink messages according to a mapping relationship defined in a private ME according to an embodiment of the present invention.

FIG. 5 is a flowchart of an implementation mode of scheduling uplink messages according to a mapping relationship defined in a private ME according to an embodiment of the present invention. This implementation mode can schedule two kinds of uplink messages which support the private ME configuration and do not support the private ME configuration, the flow includes the steps as follows.

Step 300: the process of scheduling an uplink message is started.

Step S301: the pq corresponding to the P-bit of each uplink message is searched in the MIB of the ONU in order, i.e., the object to which each P-bit pointer points is searched, for example, the pqs corresponding to P-bit0, P-bit1, P-bit2 and P-bit4 are searched in the MIB of the ONU in turn.

In this step, if only the mapping relationship between the pqs and the P-bits of the uplink messages within the same GEM PORT is defined in the private ME, when the uplink messages mapped to the same GEM PORT are searched, the search can be performed according to the P-bit of each uplink message, for example, first search the pq corresponding to the uplink messages with higher P-bit, then search the pq corresponding to the uplink messages with lower P-bit.

If the mapping relationship between the pqs and the P-bits of the uplink messages within different GEM PORTs is also defined in the private ME, the search operation can be executed on the uplink messages mapped to each GEM PORT until the completion of the scheduling of the uplink messages mapped to all the GEM PORTs.

Step S302: it is judged whether or not the P-bits of all the uplink messages are traversed, if yes, proceed to Step S303, otherwise proceed to Step S304.

Step S303: the process is ended, which indicates that the scheduling of all the uplink messages has been completed, or cannot be normally performed.

Step S304: it is judged whether or not the corresponding pq is nonempty, if so, proceed to Step S305, otherwise return to Step S301 to search the pq corresponding to the P-bit of the next uplink message.

Step S305: the pq corresponding to the P-bit of the uplink message is searched in the private ME, i.e., for the uplink messages which support the private ME configuration, give priority to the creation of the pq according to the mapping relationship between the pq and the P-bit of the uplink message defined in the private ME.

Step S306: it is judged whether or not the corresponding pq is nonempty, if so, proceed to Step S308, otherwise proceed to Step S307.

Step S307: a default pq corresponding to the GEM PORT associated with the 802.1p entity is selected, i.e., for the uplink message which do not support the private ME configuration, the default pq corresponding to the GEM PORT associated with the 802.1p entity is selected, for example, the uplink messages with higher P-bit can enter the pq with earlier priority order.

Step S308: it is judged whether or not the found pq has been created, if so, return to Step S301 to search the pq corresponding to the P-bit of the next uplink message, otherwise proceed to Step S309.

Step S309: the corresponding pq is created, and return to Step S301 to search the pq corresponding to the P-bit of the next uplink message.

The present invention also provides a system for scheduling an uplink message based on a GPON, including an 802.1p entity. A private ME is configured in the 802.1p entity, and a mapping relationship between a pq and a P-bit of an uplink message is defined in the private ME; the 802.1p entity is configured to schedule an uplink message from an ONU and map the uplink message to a corresponding GEM PORT, and create a corresponding pq according to the mapping relationship between the pq and the P-bit of the uplink message defined in the private ME.

Figure 6:
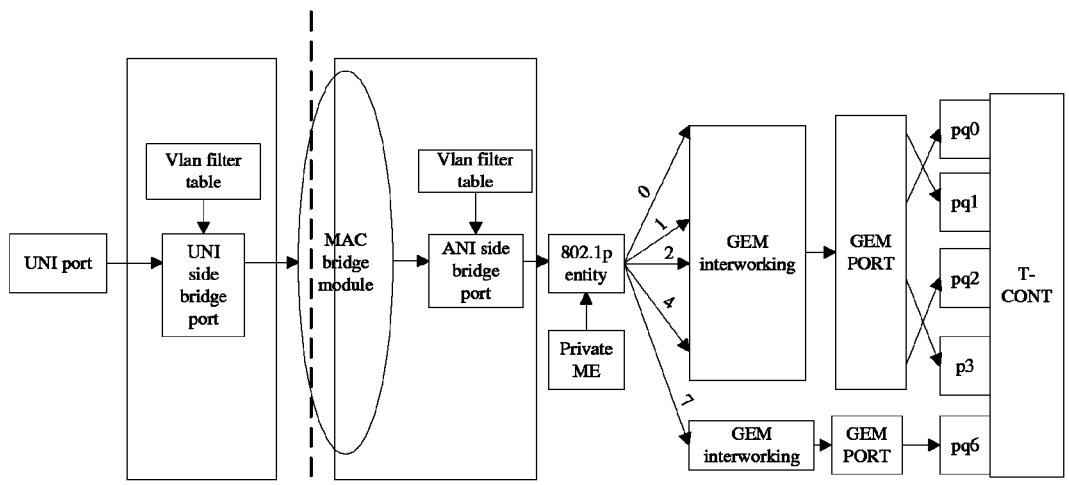
FIG. 6 is an N:M bridge-mapping service model of a system for scheduling an uplink message based on the GPON according to an embodiment of the present invention.

FIG. 6 is a schematic diagram of an N:M bridge-mapping service model of a system for scheduling an uplink message based on the GPON according to an embodiment of the present invention, in which a specific application scenario is realized when the GPON system bears the Ethernet service.

When scheduling the uplink messages of a certain user port in a unicast manner, the MAC bridge module transmits the uplink messages received from the User Network Interface (UNI) side bridge port corresponding to the UNI to an Access Network Interface (ANI) side bridge port according to the VLAN Tag field and destination MAC address of the unlink messages. After the uplink messages are output from the ANI side bridge port, the 802.1p entity schedules the uplink messages with Tag Control Information (TCI) in VLAN Tag being respectively (100,0), (100,1), (100,2) and (100,4) (i.e., the P-bits of the uplink messages are respectively 0, 1, 2 and 4) and maps the uplink messages to the same GEM PORT, and creates the pqs according to the mapping relationship between the pqs and the P-bits of the uplink messages defined in the private ME, wherein the uplink message with P-bit being 0 corresponds to pq1, the uplink message with P-bit being 1 corresponds to pq0, and so on.

In the embodiment, the mapping relationship between the pqs and the P-bits of the uplink messages within different GEM PORTs is also defined in the private ME. As shown in the figure, the 802.1p entity also schedules the uplink message with Tag Control Information (TCI) in VLAN Tag being (100, 7) (i.e., the P-bit of the uplink message is 7) and maps the uplink message to another GEM PORT, and creates pq6 for the uplink message according to the mapping relationship between the P-bit7 and the pq6 defined in the private ME.

Through the above-mentioned embodiments of the present invention, a private ME is additionally configured in the 802.1p entity under the N:M bridge-mapping service model, so that the 802.1p entity can flexibly schedule an uplink message according to the mapping relationship between the pq and the P-bit of the uplink message defined in the private ME, which provides a reasonable basis for Ethernet service with respect to the creation of service flow. Therefore, it is a beneficial extension to the related art. The operator can make the 802.1p entity schedule the uplink messages with different P-bits and create different pqs according to needs, for example, the uplink messages with higher P-bits can be selected to be transmitted via a pq with relatively later order, at the same time, the number of the pqs needed to be created is determined, thus it is more convenient for transmission control.

Additionally, in the above-mentioned embodiments of the present invention, two situations whether or not the uplink messages support the private ME configuration are also taken into consideration. Corresponding pqs are respectively created for the uplink messages which support the private ME configuration and do not support the private ME configuration according to a certain scheduling rule, thereby making the method for scheduling an uplink message more reasonable and comprehensive.

The above is the detailed description made to the present invention in conjunction with specific preferred embodiments, but it should not be considered that the specific embodiments of the present invention are only limited to these descriptions. For those skilled in the art to which the present invention belongs, many deductions and replacements can be made without departing from the concept of the present invention. Such deductions and replacements should fall within the scope of protection of the present invention.

What is claimed is:

1. A method for scheduling an uplink message based on a Gigabit-Capable Passive Optical Network (GPON), the method comprising:
    configuring a private managed entity for an 802.1p entity, and defining a mapping relationship between a priority queue and a priority of an uplink message in the private managed entity; and
    scheduling, by the 802.1p entity, an uplink message from an optical network unit, mapping the uplink message to a corresponding GPON Encapsulation Method Port (GEM PORT), and creating a corresponding priority queue according to the mapping relationship between the priority queue and the priority of the uplink message defined in the private managed entity;
    wherein scheduling the uplink message from the optical network unit by the 802.1p entity and creating the corresponding priority queue according to the mapping relationship between the priority queue and the priority of the uplink message defined in the private managed entity comprises:
    A: searching the priority queue corresponding to the priority of each uplink message in order, if priorities of all uplink messages are traversed, ending the process, otherwise proceeding to B; and
    B: judging whether or not the found priority queue of the uplink message has been created, if so, returning to A to continue to search the priority queue corresponding to the priority of the next uplink message, otherwise creating the corresponding priority queue and then returning to A.

2. The method according to claim 1, wherein configuring the private managed entity for the 802.1p entity comprises: creating the private managed entity automatically by the optical network unit according to an Optical Line Terminal (OLT) command.

3. The method according to claim 1, wherein the priority of the uplink message in the private managed entity is the same as the priority of the uplink message defined by other managed entities in a management information base of the optical network unit.

4. The method according to claim 1, wherein the mapping relationship between priority queues and the priorities of uplink messages within the same GEM PORT is defined in the private managed entity.

5. The method according to claim 1, wherein the mapping relationship between priority queues and the priorities of uplink messages within different GEM PORTs is defined in the private managed entity.

6. The method according to claim 1, wherein A comprises:
A1: searching the priority queue corresponding to the priority of each uplink message in a management information base of the optical network unit in order, if the priorities of all the uplink messages are traversed, ending the process, otherwise proceeding to next;
A2: judging whether or not the priority queue corresponding to the priority of the uplink message is nonempty, if so, proceeding to A3, otherwise returning to A1;
A3: judging whether or not the priority queue corresponding to the priority of the uplink message defined in the private managed entity is nonempty, if so, proceeding to B, otherwise proceeding to A4; and
A4: finding a default priority queue corresponding to a GEM PORT associated with the 802.1p entity, then proceeding to B.

7. The method according to claim 6, wherein if the mapping relationship between priority queues and priorities of uplink messages within the same GEM PORT is defined in the private managed entity, A1 executes search operation on the uplink messages mapped to the same GEM PORT; otherwise, A1 executes search operation on the uplink messages mapped to each GEM PORT in order.

8. The method according to claim 7, wherein the order in which A1 executes search operation on the uplink messages mapped to the same GEM PORT is determined according to the priorities of the uplink messages.

9. A system for scheduling an uplink message based on a Gigabit-Capable Passive Optical Network (GPON), the system comprising:
an 802.1p entity, wherein a private managed entity is configured in the 802.1p entity, and a mapping relationship between a priority queue and a priority of an uplink message is defined in the private managed entity;
the 802.1p entity is configured to schedule an uplink message from an optical network unit and map the uplink message to a corresponding GPON Encapsulation Method Port (GEM PORT), and create a corresponding priority queue according to the mapping relationship between the priority queue and the priority of the uplink message defined in the private managed entity, wherein scheduling the uplink message from the optical network unit by the 802.1p entity and creating the corresponding priority queue according to the mapping relationship between the priority queue and the priority of the uplink message defined in the private managed entity comprises:
A: searching the priority queue corresponding to the priority of each uplink message in order, if priorities of all uplink messages are traversed, ending the process, otherwise proceeding to B; and
B: judging whether or not the found priority queue of the uplink message has been created, if so, returning to A to continue to search the priority queue corresponding to the priority of the next uplink message, otherwise creating the corresponding priority queue and then returning to A.

* * * * *